United States Patent [19]

Long et al.

[11] Patent Number: 4,544,213
[45] Date of Patent: Oct. 1, 1985

[54] DISKETTE FILING AND STORAGE CONTAINER

[75] Inventors: Jerry M. Long, Scotts Valley; James A. Womack, Los Gatos, both of Calif.

[73] Assignee: Innovative Concepts, Inc., San Jose, Calif.

[21] Appl. No.: 403,774

[22] PCT Filed: Nov. 24, 1980

[86] PCT No.: PCT/US80/01581
§ 371 Date: Jul. 22, 1982
§ 102(e) Date: Jul. 22, 1982

[87] PCT Pub. No.: WO82/01810
PCT Pub. Date: Jun. 10, 1982

[51] Int. Cl.[4] .............................................. A47B 63/00
[52] U.S. Cl. .................................... 312/183; 312/111; 220/22.3; D19/76
[58] Field of Search ......... 312/183, 326, 271, DIG. 76, 312/DIG. 33, DIG. 65; 206/45.13, 425; 220/22.1, 22.2, 22.3, 22.5

[56] References Cited

U.S. PATENT DOCUMENTS

| D. 243,526 | 3/1977 | Overman | D19/76 |
|---|---|---|---|
| 464,544 | 12/1891 | Wood | 220/22.3 |
| 2,233,938 | 3/1941 | Jones | 220/22.3 |
| 2,758,602 | 8/1956 | Anderson | 220/22.3 |
| 3,065,308 | 11/1962 | Suyeoka | 206/45.13 |
| 3,696,926 | 10/1972 | Syversen | 312/183 |
| 3,783,999 | 1/1974 | Smith | 206/45.13 |
| 3,817,393 | 6/1974 | Neilsen | 312/183 |
| 4,084,699 | 4/1978 | Koepke | 220/22.3 |
| 4,084,865 | 4/1978 | Joyce | 312/111 |
| 4,325,595 | 4/1982 | Solomon | 312/183 |

FOREIGN PATENT DOCUMENTS

| 829656 | 1/1952 | Fed. Rep. of Germany | 312/183 |
| 1241412 | 6/1967 | Fed. Rep. of Germany | 220/22.3 |

Primary Examiner—Victor N. Sakran
Attorney, Agent, or Firm—Claude A. S. Hamrick

[57] ABSTRACT

A filing and storage container for floppy disks and diskettes including a molded base unit (10), a molded cover unit (12) pivotally attached to the base, a plurality of indexing file separators (60), and means (40), (46) provided along the lower portions of the inside walls of the base unit for receiving the lower edges of the file separators and allowing them to pivot between rearwardly inclined positions and forwardly inclined positions.

9 Claims, 10 Drawing Figures

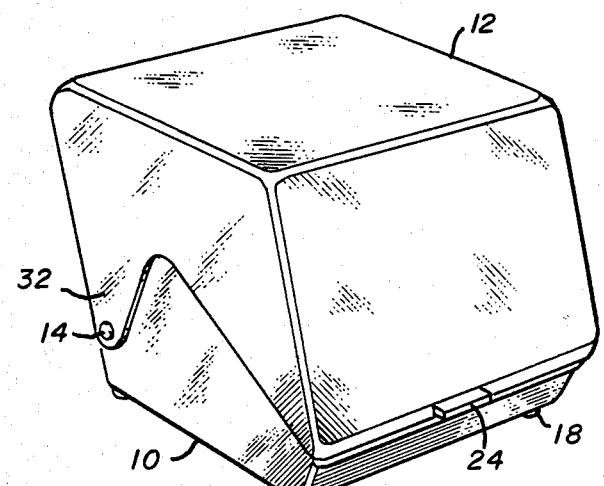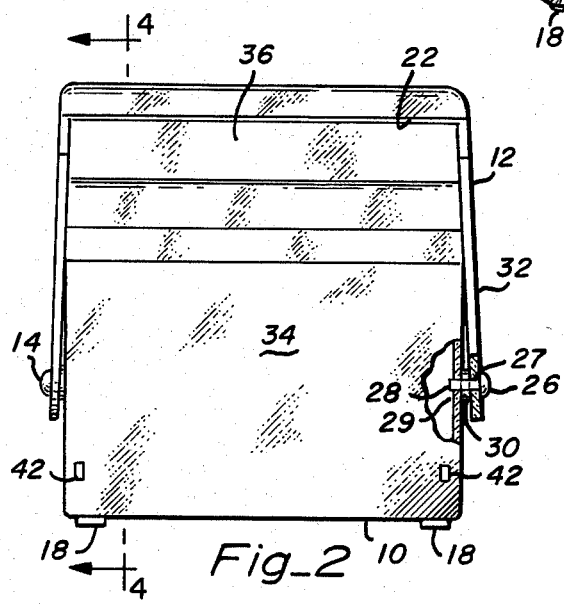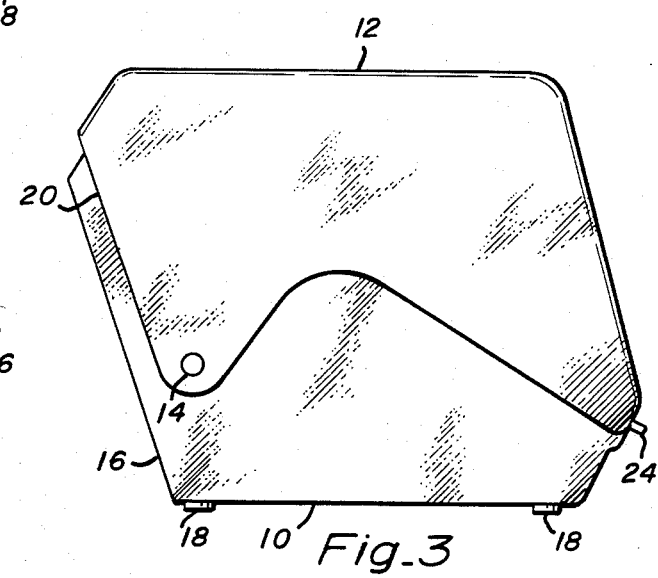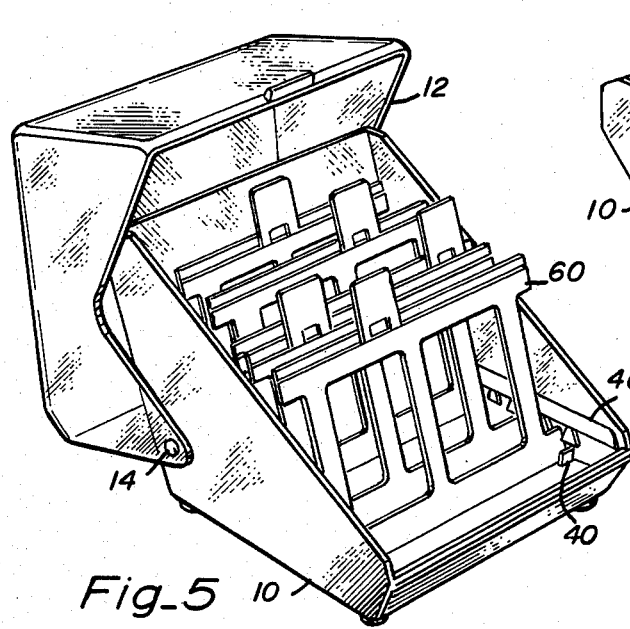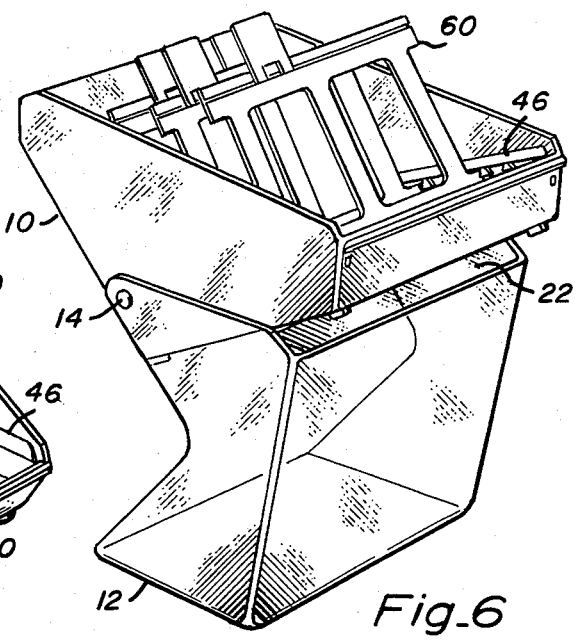

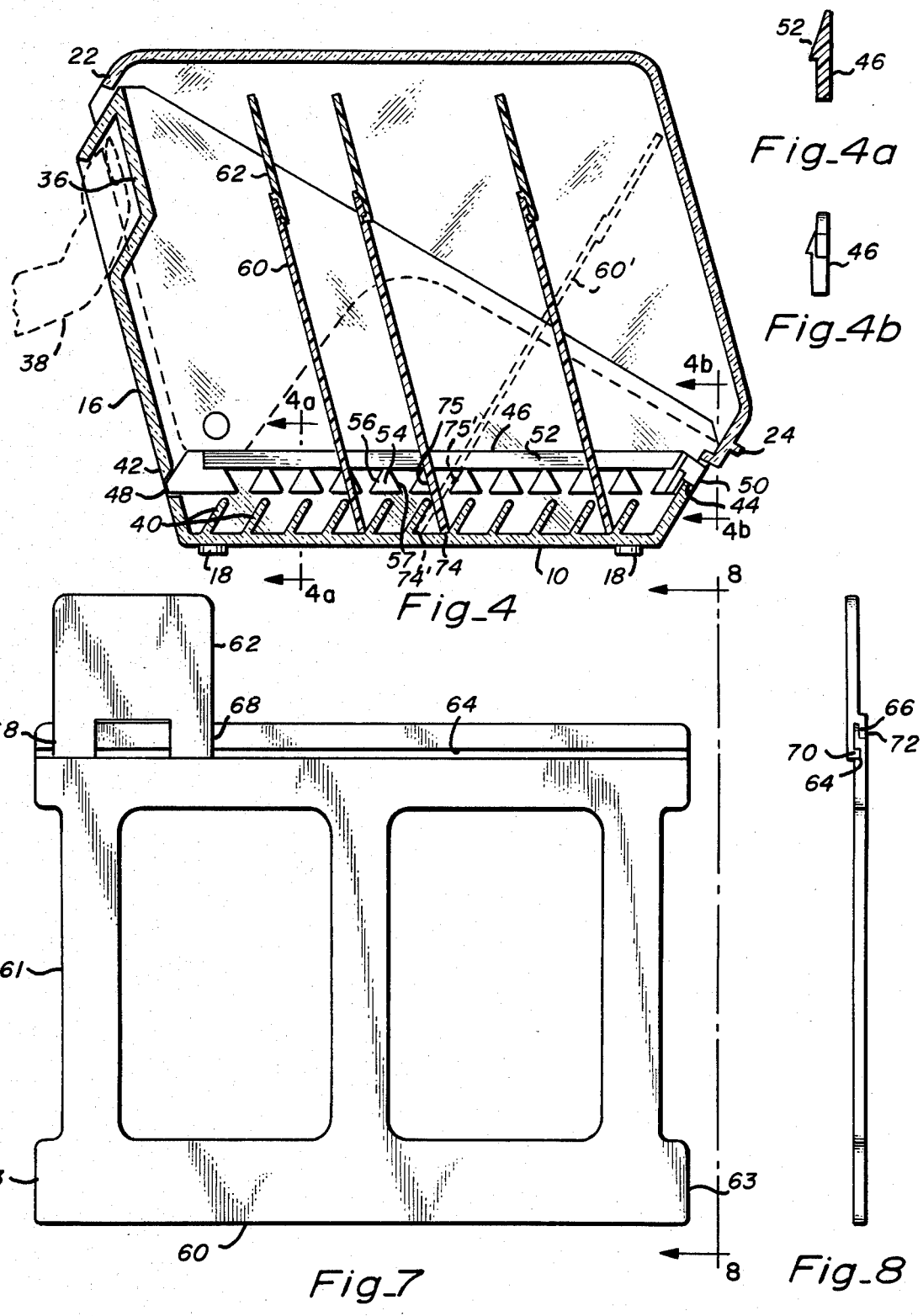

DISKETTE FILING AND STORAGE CONTAINER

BACKGROUND OF THE INVENTION

1. Field of the Invention

The present invention relates generally to desk top storage containers and more particularly to such containers designed specifically for filing and storing floppy disks and diskettes.

2. Description of the Prior Art

Numerous attempts have been made to provide a desk top filing and storage container suitable for filing the floppy disk and diskette media now commonly used in word processing systems. However, such systems have either been unattractive, unduly expensive or impractical.

The present application is related to our co-pending design patent application which has now been issued as U.S. Pat. No. Des. 267,911.

SUMMARY OF THE PRESENT INVENTION

It is therefore a primary objective of the present invention to provide a new filing and storage container for floppy disks and diskettes which is highly functional, simple in construction, yet attractive in design.

Another object of the present invention is to provide a container of the type described which can be readily manufactured using injection molding techniques.

Another object of the present invention is to provide a container of the type described having means for separating and identifying various media envelopes filed therewithin.

Briefly, a preferred embodiment of the present invention includes a molded base unit, a molded cover unit pivotally attached to the base, a plurality of indexing file separators, and means provided along the lower portions of the inside walls of the base unit for receiving the lower edges of the file separators and allowing them to pivot between rearwardly inclined positions and forwardly inclined positions.

An important advantage of the present invention is that all component parts are of molded plastic material which snap fit into engagement with each other thereby requiring no assembly tools or special assembly equipment.

Another advantage of the present invention is that simple stop means are provided for determining the rearly most inclined position and the forwardly most inclined position of the index separators.

These and other objects and advantages of the present invention will no doubt become apparent to those skilled in the art after having read the following detailed description of a preferred embodiment shown in the several figures of the drawing.

IN THE DRAWING

FIG. 1 is a perspective view showing the exterior of a closed diskette filing and storage container in accordance with the present invention;

FIG. 2 is a partially broken elevational view showing the rear side of the container illustrated in FIG. 1;

FIG. 3 is a side elevation illustrating the right side of the container shown in FIG. 1;

FIG. 4 is a transverse cross-sectional view taken along the line 4—4 of FIG. 2;

FIGS. 4a and 4b are respectively partial cross-sectional views taken along the lines 4a and 4b in FIG. 4;

FIG. 5 is a perspective view of a container in accordance with the present invention showing the cover in one open position;

FIG. 6 is a perspective view of a container in accordance with the present invention showing the cover in a second open position;

FIG. 7 is an elevational view showing a file separator in accordance with the present invention; and FIG. 8 is a side elevational view of the separator shown in FIG. 7.

DETAILED DESCRIPTION OF THE PREFERRED EMBODIMENT

Referring now to FIGS. 1-3, it will be noted that the subject storage container includes a molded base unit 10, and a molded cover unit 12 which is pivotally secured to base 10 by means of hinge pins 14. As best illustrated in FIG. 3, base 10 has a rearwardly sloped rear wall 16 which, as will be further discussed below, allows floppy disks or diskettes stored therein to recline rearwardly. Attached to the bottom of base 10 are four rubber support buttons 18.

Cover 12 is partially open on its rear side, as illustrated at 20 in FIG. 3 and 22 in FIG. 2, so as to accommodate opening of the cover into the positions illustrated in FIGS. 5 and 6. Cover 12 also includes a tab 24 at the front thereof for facilitating opening of the cover.

The pivot pin 14 includes a button portion 26 (FIG. 2) and an integrally formed shaft portion 28 which extends through circular openings 27 and 29 in the side walls of cover 12 and base 10 respectively. A molded annular washer 30 is tightly fit over shaft 28 in order to secure pin 14 to cover portion 12 and serves as a spacer separating the downwardly extending extremities 32 of cover 14 from the sidewalls of base 10 thereby avoiding scuffing between the two parts as the cover is rotated between its opened and closed positions.

Referring now additionally to FIG. 4, which is a cross section taken along the line 4—4 in FIG. 2, it will be noted that the upper portion of the rear wall 16 of base 10 is provided with a recess 36 which extends across the entire rear wall. This recess and the downwardly sloped upper portion thereof provide a convenient hand-hold means by which the container can be carried by simply-inserting the fingers thereinto as illustrated by the dashed lines 38 in FIG. 4.

As shown in FIGS. 4 and 5, a plurality of upstanding divider tabs 40 are integrally formed along each interior side of base 10 and slope forwardly as indicated. Disposed immediately above the tabs 40 is an indexing rail 46, the ends 48 and 50 of which are inserted into the openings 42 and 44 respectively, in the front and rear walls of base 10.

As indicated more clearly by the cross section shown in FIG. 4a, the upper portion 52 of rail 46 is tapered downwardly so as to facilitate entry of diskettes into the container as will be discussed below. The lower portion of rail 46 is formed into downwardly extending generally triangularly shaped stop tabs 54. Note that the rear side edge 56 of each tab 54 slopes forwardly so as to be parallel to the front surfaces of divider tabs 40 and is spaced forwardly of the corresponding tab 40 for reasons to be explained below. The forward side edge 57 of each tab 54 is inclined rearwardly to provide a stop as discussed below.

Referring now to FIGS. 7 and 8 which illustrate file separators in accordance with the present invention, it can be seen that such separators include a separating portion 60 and an indexing tab portion 62 which can be selectively positioned along the length of portion 60. To accommodate such positioning, a groove 64 is provided in the face of separator 60 and the upper rear edge 66 thereof is sloted. Tab 62 is configured to have a pair of downwardly extending legs 68 on each side with rearwardly extending projections 70 at their distal ends for engaging groove 64. A centrally disposed downwardly extending leg 72 is also provided which extends behind portion 60 to engage slot 66. The sides of separator 60 are notched as illustrated at 61 to form laterally extending separator tabs 63 which when properly positioned engage tabs 40 and stop tabs 54.

The container is assembled by first gluing the rubber feet 18 onto the bottom of base 10. The side rails 46 are then bowed so that the end 48 can be inserted into opening 42 in base 10 and the end 50 can be inserted into opening 44. The separators 60 are then bowed so that the tabs 63 can be positioned between the tabs 40 and 54 as illustrated in FIGS. 4 and 5. Next, the pivot pins 14 are inserted through openings 27 in the downwardly extending extremities 32 of cover 14, and the annular collars 30 are inserted over the shafts 28. With the pins so installed, the cover extremities 32 may then be deflected outwardly so that the pins 14 can clear the sidewalls of base 14. The pins 14 are then aligned with the openings 29 in the sides of base 10 and the sidewalls are allowed to spring back into position driving pins 26 into mating engagement with the openings 29.

As illustrated in FIGS. 5 and 6, when in use, the cover 12 can be opened into the position shown in FIG. 5 so that the rear portion thereof rests upon the supporting surface. In such position, access is readily had to any files stored within the base between the separators 60. Alternatively, cover 12 can be rotated further rearwardly with base 10 raised such that it assumes the position illustrated in FIG. 6. The cover 12 thus provides a stand for elevating the base 10 above the supporting surface.

In FIG. 4, it is apparent that the file separators 60 will normally be positioned inclining to the rear with the lower edge thereof engaging the rear side of one of the divider tabs 40, as illustrated at 74, and the upper portion of the separator tabs 63 resting against the forward most side edges of a pair of tabs 54, as indicated at 75. Separator 60 can also be rotated into a forwardly inclining position as illustrated by the dashed lines 60' whereby the lower edge thereof engages the front sides of a pair of tabs 40, as indicated at 74', and the upper portion of the separator tabs 63 engage the rear edges of a pair of tabs 54, as illustrated at 75'.

Note that in the illustrated embodiment, as many as 11 separators can be utilized to separate as many floppy disks as can be stored within the container. Note also that since the uppermost portions 52 of side rails 46 are beveled, a floppy disk can be easily inserted between any two of the separators without interference with either the tabs 40 or the tabs 54. The container therefore provides a convenient means of storing a large number of floppy disks on a desk top, readily accessible to a typist or operator using a word processor or other computerized device. Since the file is both light and readily portable, it can also be easily removed to a storage area and be replaced by another container.

Although a single embodiment of the invention has been described above, it is understood that numerous alterations and modifications thereof will become apparent to those skilled in the art after having read the above disclosure. It is therefore intended that the appended claims be interpreted as covering all such alterations and modifications as fall within the true spirit and scope of the invention.

What is claimed is:

1. A filing and storage container for floppy diskettes and the like comprising:

means forming an open-topped container base including a horizontally disposed bottom, a rearwardly leaning first rear wall of a first height, a forwardly leaning first front wall of a second height substantially lower than said first height, a pair of upstanding first side walls the upper edges of which incline rearwardly from the upper edge of said first front wall to the upper edge of said first rear wall, said base having divider means positioned at spaced intervals along the inside of at least one of said first side walls proximate to where the wall engages said bottom;

separator means disposed at least partially within said base and held in spaced apart relationship by said divider means, said separator means being rotatable between rearwardly inclined positions generally parallel to said rear wall and forwardly inclined positions generally parallel to said front wall; and cover means forming a closure for said open-topped base and having a horizontally disposed top portion, a downwardly extending second front wall sloped rearwardly and lying generally parallel to said first rear wall and having a lower extremity adapted to engage the upper edge of said first front wall, a pair of downwardly extending second side walls disposed outwardly of said first side walls and having rear most portions which extend downwardly to points substantially level with said upper edge of said first front wall, and pivot means for pivotally attaching the lower extremities of said rear most portions of said side walls to a lower portion of said container base so that said cover means can be rotated rearwardly more than 180 degrees from a closed position covering the open top of said base to an open position with said second front wall forming a horizontally disposed support surface, the rear most extremity of said cover means engaging said bottom and combining with said pivot means to support said base in a raised position with the opening thereof facing upwardly.

2. A filing and storage container as recited in claim 1 and further comprising stop means disposed above said divider means and forming forward and rear stops to be engaged by said separator means so as to define said forwardly inclined positions and said rearwardly inclined positions.

3. A filing and storage container as recited in claim 2 wherein said stop means is formed by at least one side rail affixed to said base, said rail having projections extending downwardly therefrom to form said forward and rear stops.

4. A filing and storage container as recited in claim 3 wherein said separator means are provided with laterally extending tabs for engaging said rail projections to limit rotation of said separator means.

5. A filing and storage container as recited in claims 1, 2, 3 or 4 wherein said first rear wall includes means located in the upper portion thereof and forming a hand-hold disposed beneath but proximate to the rear most edge of said top and accessible when said cover means is in its closed position for facilitating the carrying of said container.

6. A filing and storage container as recited in claims 1, 2, 3 or 4 wherein said separator means includes separator bodies with grooves formed along their upper edges and indexing tabs with projections which slidably engages the grooves in said separator bodies to allow said indexing tabs to be slidably attached to and selectively positioned along an upper portion of said separator bodies.

7. A filing and storage container as recited in claims 3 or 4 wherein said base has openings formed in the front and rear walls thereof at positions proximate said bottom, and said side rail is flexible and is affixed to said base by bowing it and inserting the ends thereof into respective ones of said openings formed in said base.

8. A filing and storage container as recited in claims 3 or 4 wherein said projections are generally triangular in shape and extend downwardly from a main rail body, said forward and rear stops being formed by opposite sides of said triangular projections.

9. A filing and storage container suitable for containing floppy disks, floppy diskettes and the like, said container comprising means forming a container base (10) having a bottom, upstanding side walls, a front wall and a rear wall (16), said base having means forming divider tabs (40) positioned at spaced intervals at least in the region where one of the side walls engages the bottom, separator means (60) disposed at least partially within said base means (10) and held in spaced apart relationship by said divider tabs (40), said separator means being rotatable between rearwardly inclined positions and forwardly inclined positions, characterised in that the rear wall (16) leans rearwardly, and the front wall leans forwardly and has a height less than the height of the rear wall, and in that a cover (12) is provided, the cover having a top, a downwardly extending front wall and side walls and a rear side (22), and means (14) for pivotally attaching said side walls to said base portion so that the cover means can be rotated from a closed position covering said base and said separator means to an open position, and so that the cover means can be pivotally rotated beyond the open position into a support position wherein the rear side (22) of said cover engages said bottom (10), said cover means then serving as a support for said base, holding it in a raised position above a supporting surface.

* * * * *

Disclaimer 4,544,213.—*Jerry M. Long,* Scotts Valley; and *James A. Womack,* Los Gatos, Calif. DISKETTE FILING AND STORAGE CONTAINER. Patent dated Oct. 1, 1985. Disclaimer filed Oct. 30, 1985, by the assignee, *Innovative Concepts, Inc.*

The term of this patent subsequent to Feb. 15, 1997, has been disclaimed.
[*Official Gazette December 31, 1985.*]